United States Patent Office 2,973,818
Patented Mar. 7, 1961

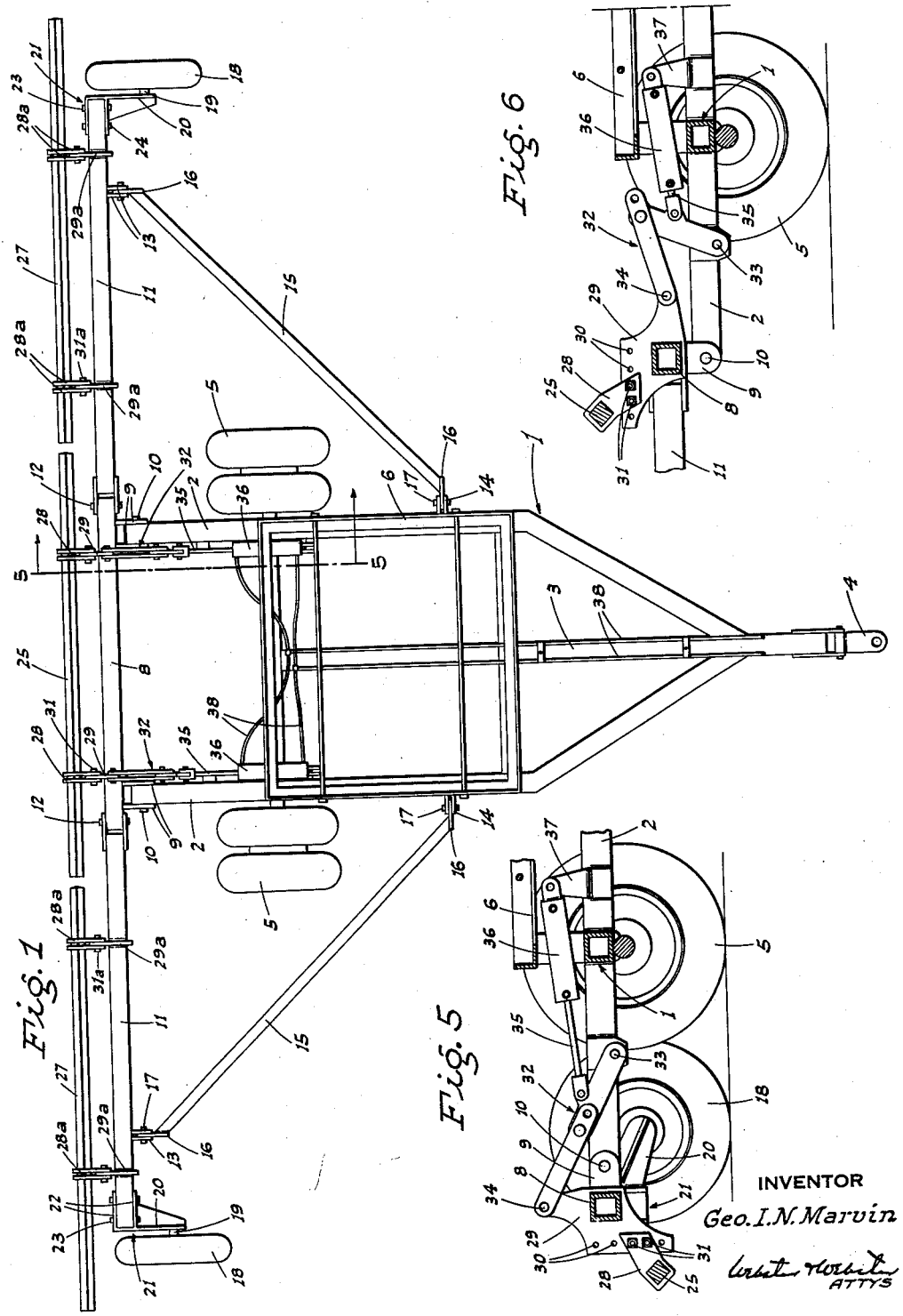

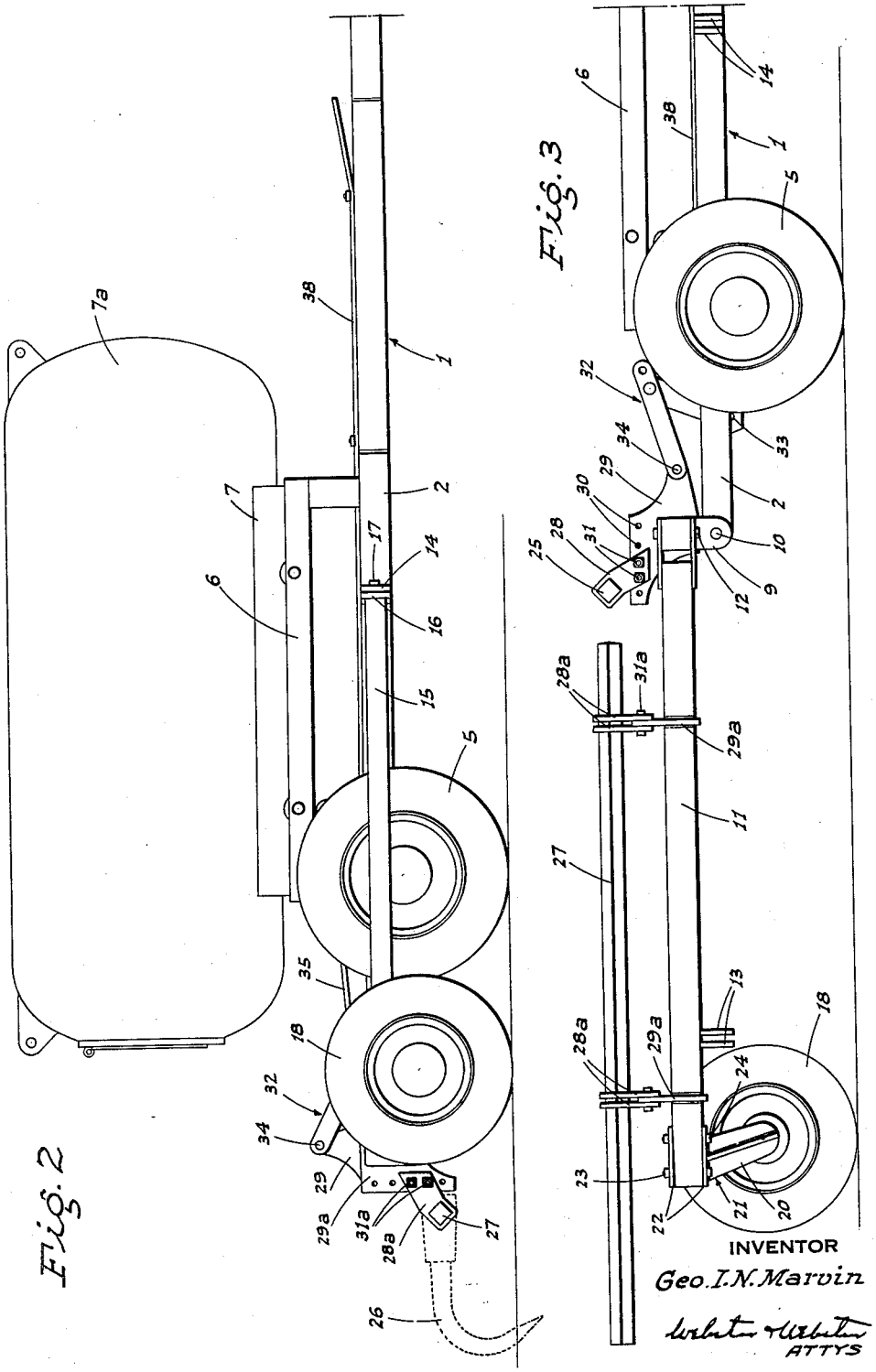

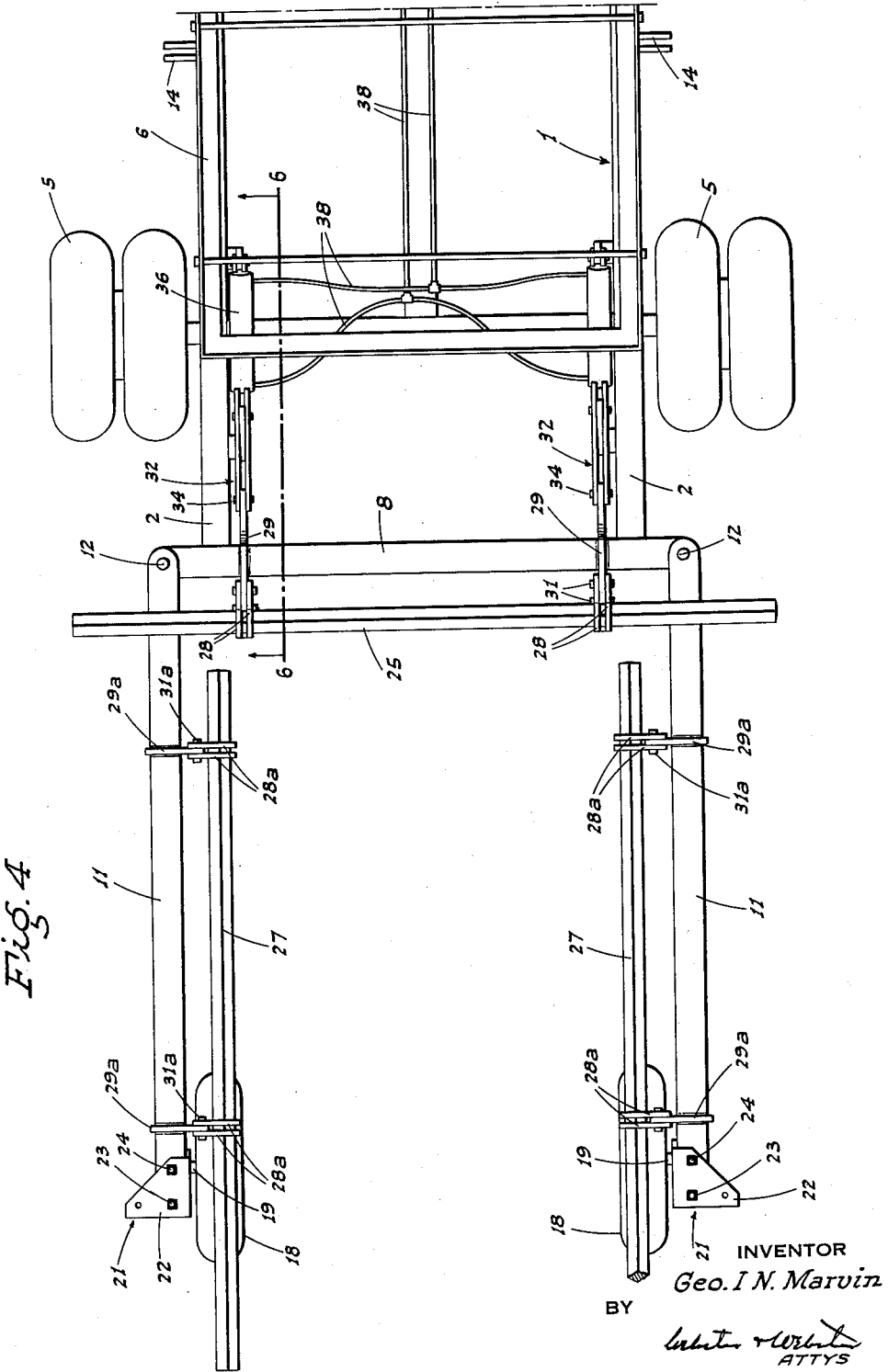

2,973,818

WHEELED TRAILER FOR LIQUID FERTILIZER APPLYING APPARATUS

George I. N. Marvin, P.O. Box 209, Woodland, Calif.

Filed July 26, 1956, Ser. No. 600,224

2 Claims. (Cl. 172—456)

This invention relates to agricultural implements; a major object being to provide a tractor-drawn trailer unit which is not only arranged to carry a plurality of ground tillage tools, such as cultivators, but also a tank of liquid fertilizer adapted to be connected in feeding relation to the tools.

Another object of the invention is to construct the trailer so that the tool-mounting portion thereof is relatively wide when in an operating position, but may be folded to occupy a considerably narrower space transversely, as is desirable for transportation purposes, and for movement through farm gates and the like. At the same time when such folding is effected, the tank is not disturbed, nor does its weight interfere with or affect the folding operation.

A further object of the invention is to arrange the tool-carrying and folding portion of the trailer so that when folded the tools are raised well clear of the ground.

The tool-carrying portion of the trailer includes a toolbar unit composed of a central section, and side sections alined therewith when in an operating position, but trailing therefrom when in a folded position. In connection with this tool bar-unit arrangement, an additional object is to provide supporting wheels arranged to be adjusted so as to not only support the side tool bar sections at their outer end when the latter are in their operating position, but to also support said sections at their rear end when the same are disposed in their folded or trailing relation to the central section.

It is also an object of the invention to provide a wheeled trailer for liquid fertilizer apparatus which is designed for ease and economy of manufacture.

Still another object of the invention is to provide a practical, reliable, and durable wheeled trailer for liquid fertilizer, and one which will be exceedingly effective for the purpose for which it is designed.

These objects are accomplished by means of such structure and relative arrangement of parts as will fully appear by a perusal of the following specification and claims.

In the drawings:

Fig. 1 is a top plan view of the trailer in its operating position.

Fig. 2 is a fragmentary enlarged side elevation of the trailer in its operating position, showing a fertilizer tank mounted thereon.

Fig. 3 is a similar view, but showing the trailer in its folded position.

Fig. 4 is a fragmentary plan view of the trailer in its folded position, or as in Fig. 3.

Fig. 5 is a fragmentary enlarged sectional elevation taken on line 5—5 of Fig. 1.

Fig. 6 is a similar view taken on line 6—6 of Fig. 4.

Referring now more particularly to the drawings, and to the characters of reference marked thereon, the trailer comprises a main frame, indicated generally at 1, which includes side beams 2 and a forwardly projecting tongue 3 provided at its forward end with a hitch plate 4 adapted for draft connection with the drawbar of a tractor, or of a truck if the trailer is merely being transported.

Wheels 5, laterally out from beams 2 intermediate their ends, support the frame from the ground in addition to the support afforded by the hitch connection with the tractor.

The side beams 2, from the wheels forwardly, also support an upstanding horizontal cradle frame 6, adapted to support and locate the base member 7 of a conventional form of tank 7a to carry a supply of liquid fertilizer. Such tank is not connected to—or permanently mounted on—the cradle in any way, and may be easily lifted off when empty and replaced by a full tank.

Locating the tank on the frame ahead of the wheel center prevents any tendency of the weight of the tank to tip the frame down at the rear.

A transverse beam 8, preferably no longer than the gauge of the wheels 5 is disposed slightly to the rear of beams 2, and is provided with rigid ears 9 which straddle, and are pivoted to, the rear end of said beams 2 by transverse pivot pins 10. When the trailer is in an operative position, the beam 8 is in the horizontal plane of beams 2, with the ears projecting forwardly, as shown in Fig. 5.

Projecting laterally out from beam 8 and alined therewith when the trailer is in operating position, are side beams 11, of square cross section, and pivotally connected to beam 8 at their adjacent ends, as at 12; the pivotal axes extending lengthwise of the trailer when the beams 8 and 11 are in their extended operating position, as shown in Fig. 1.

Beams 11 toward their outer end carry ears 13 projecting forwardly when said beams are extended, while frame beams 2 carry outwardly projecting ears 14 disposed well ahead of the wheels 5. Brace bars 15 extend between corresponding ears 13 and 14; each bar having end ears 16 cooperating with said ears 13 and 14 and detachably connected thereto by bolts or pins 17.

The pins 17 of ears 14 are substantially alined with pivots 12, so that the beams 11 may swing up and down without binding.

A wheel 18 is provided for the outer end of each beam 11; the axial spindle 19 for such wheel being supported from arm 20 depending from a bracket 21 which includes plates 22 spaced to fittingly straddle the beam 11 at its outer end. The plates are drilled to receive a permanently mounted pivot bolt 23 and a removable locking bolt 24 drilled through the beam 11. This arrangement enables each bracket to be swung through a 90 degree arc from one position to another, and to be locked against movement from either position. The purpose of this will be seen later.

A tool bar section 25, of conventional form and on which suitable tools, such as cultivator teeth, as indicated at 26 in Fig. 2 are mounted, is disposed a short distance rearwardly of, and parallel to, the central beam 8, while similar tool bar sections 27 are disposed laterally out from section 25 in alinement therewith when in operating position, as shown in Fig. 1.

The tool bar section 25 is adjustably secured to beam 8 by means of pairs of ears 28 spaced along the section and secured thereon, and which straddle plates 29 fixed on the beam. Each plate projects rearwardly of beam 8 (when said beam is in an operating position) a sufficient distance to give room for a vertical row of holes 30 (see Fig. 5) through certain ones at a time of which bolts 31 project, and which secure the ears 28 to the plates 29. In this manner, the depth of penetration of the cultivator teeth or other tools may be altered while maintaining the supporting beam 8 at a constant level.

The side tool bar sections are similarly mounted in connection with beams 11 by means of cooperating ears 28a, plates 29a, and bolts 31a.

A toggle link unit 32 extends forwardly from each plate 29, being pivoted at its forward end in connection with the adjacent frame beam 2, as at 33, and at its rear end on said plate 29, as at 34.

The pivot 34 is disposed so as to be above beam 8 when the latter is in its lowered operative position; the link unit 32 being then fully extended as shown in Fig. 5. Each link unit 32 is connected to the piston rod 35 of a double-acting hydraulic cylinder or ram 36 which is supported from a bracket 37 secured to the adjacent frame beam 2, as shown in Figs. 5 and 6.

Fluid is fed to, or withdrawn from, both rams simultaneously by suitable branched conduits 38 which extend along the tongue 3 and are adapted at their forward end for connection to the hydraulic system of a tractor.

In operation, assuming that the implement has been in use and that it is desired to fold the same for transportation, the braces 15 are first removed, and the beams 8 and 11 are then swung up as a unit, by admission of fluid to the rear end of the cylinders 36, from the initial position of Fig. 5 to the position shown in Fig. 6. The tools mounted on the tool bar sections are thus raised from the ground well clear thereof, and also the pivots 12 are disposed vertically.

This enables the side beams 11, together with the corresponding tool bar sections, to be swung to the trailing position of Fig. 4; the wheels 18 supporting the beams as they are so swung. Such movement of the beams disposes these wheels so that they then lie transversely of the trailer.

Nextly, the locking bolts 24 are removed, and the brackets 20 are swung laterally inward 90 degrees from their initial position on beam 11 and so that they are then in a position such that the wheels occupy a normal position with their spindles transversely of the trailer, as shown in Fig. 4. Said locking bolts 24 are then replaced to retain the brackets in the adjusted position.

The total width of the trailer is thus reduced so that it is no wider than the span of wheels 5, and the trailer may be readily hauled along roads and through farm gates of ordinary width. Also, the then elongated trailer can easily negotiate curves as it is drawn along, because of the free-swinging and wheel-supported mounting of the trailing beams 11.

From the foregoing description it will be readily seen that there has been produced such a device as well substantially fulfill the objects of the invention, as set forth herein.

While this specification sets forth in detail the present and preferred construction of the device, still in practice such deviations from such detail may be resorted to as do not form a departure from the spirit of the invention as defined by the appended claims.

Having thus described the invention, the following is claimed as new and useful, and upon which Letters Patent are desired:

1. In a trailer for mounting earth working tools which comprises a wheeled supporting frame, a central transverse beam disposed at the rear end of the frame, pivot means mounting the beam on the frame for swinging movement about a transverse axis through a ninety degree arc between a relatively lowered operating position and a raised inoperative position, side beams projecting laterally out from the central beam when the latter is in said operating position, tool bar sections rigid with the beams, means pivotally connecting the side beams to the central beam at their adjacent ends for vertical swinging of the side beams about horizontal axes extending lengthwise of the trailer when the central beam is in said operative position, said pivot means being arranged so that when the central beam is swung upwardly the side beams will be correspondingly swung whereby the side beam pivots are then disposed vertically so that said side beams may be swung to a trailing position relative to the central beam and are then at a higher level than when in said operative position; wheels to support the outer ends of the side beams, and means adjustably mounting the wheels on said beams so that they will engage the ground with either the lowered or raised position of the beams.

2. A structure, as in claim 1, in which the mounting means for each wheel comprises a bracket engaging the related beam, a pivot connection between the bracket and beam transversely of the latter and horizontally disposed when the beam is in a lowered operative position, and an arm rigid with and projecting from the bracket at a forward and downward angle other than 45 degrees and from which arm the related wheel is supported.

References Cited in the file of this patent

UNITED STATES PATENTS

| 186,865 | Moore | Jan. 30, 1877 |
| 417,466 | Bergendahl | Dec. 17, 1889 |
| 1,484,622 | Claus | Feb. 26, 1924 |
| 1,927,458 | Klise | Sept. 19, 1933 |
| 2,095,417 | Messersmith | Oct. 12, 1937 |
| 2,597,533 | Rogers | May 20, 1952 |
| 2,619,016 | Dooley | Nov. 25, 1952 |
| 2,731,901 | Tye | Jan. 24, 1956 |
| 2,750,724 | Stephenson | June 19, 1956 |

FOREIGN PATENTS

| 19,044 | Australia | Aug. 8, 1924 |
| 906,280 | France | May 14, 1945 |